(12) United States Patent
Stilwell et al.

(10) Patent No.: US 6,871,802 B2
(45) Date of Patent: Mar. 29, 2005

(54) SELF-MODULATING INERT GAS FIRE SUPPRESSION SYSTEM

(75) Inventors: Bradford T. Stilwell, Blue Springs, MO (US); Michael J. Keiter, Kansas City, MO (US); Devang Narharilal Patel, London (GB); Keith Leslie Goodall, Sandhurst (GB)

(73) Assignee: Fike Corporation, Blue Springs, MO (US)

( * ) Notice: Subject to any disclaimer, the term of this patent is extended or adjusted under 35 U.S.C. 154(b) by 88 days.

(21) Appl. No.: 10/377,558

(22) Filed: Feb. 27, 2003

(65) Prior Publication Data

US 2004/0194977 A1 Oct. 7, 2004

(51) Int. Cl.[7] ................................................ B05B 1/30
(52) U.S. Cl. ......................... 239/583; 169/19; 169/33; 251/28; 251/30.03; 251/129.07; 251/282
(58) Field of Search ..................... 239/96, 583; 169/19, 169/33; 251/28, 30.03, 129.07, 282

(56) References Cited

U.S. PATENT DOCUMENTS

| | | |
|---|---|---|
| 179,863 A | 7/1876 | Moritz |
| 196,255 A | 10/1877 | Schooley |
| 296,664 A | 4/1884 | Averell |
| 314,649 A | 3/1885 | Campbell |
| 439,586 A | 10/1890 | Crawford |
| 633,662 A | 9/1899 | Schneible |
| 781,913 A | 2/1905 | Schutte |
| 880,402 A | 2/1908 | Reynolds |
| 1,646,640 A | 10/1927 | Daniel |

(Continued)

FOREIGN PATENT DOCUMENTS

| | | |
|---|---|---|
| EP | 117208 | 8/1984 |
| GB | 1405493 | 9/1975 |
| GB | 2157810 | 10/1985 |
| IT | 359757 | 6/1938 |
| JP | 4620421 | 6/1971 |
| SU | 244047 | 5/1969 |
| SU | 523664 | 8/1976 |

*Primary Examiner*—Christopher Kim
(74) *Attorney, Agent, or Firm*—Hovey Williams LLP

(57) ABSTRACT

A relatively low pressure inert gas hazard suppression system (20) is provided which is designed to protect a room (22) or the like from the effects of fire or other hazard. The system (20) includes a plurality of pressurized inert gas cylinders (24) each equipped with a valve unit (26); each valve unit (26) is in turn coupled via a conduit (28) to a delivery manifold (30). The respective valve units (26) are operable to deliver gas from the cylinders (24) at a generally constant pressure (usually around 10–100 bar) throughout a substantial portion of the time of gas delivery, to thereby provide effective hazard suppression without the need for expensive high-pressure gas handling and distribution hardware and a reduction in room venting area due to lower room over-pressurization. Each valve unit (26) has a valve body (48) and a shiftable piston-type sealing member (56). Gas pressure from the cylinder (24) and a spring assembly (184) biases the member 56 to the valve open position, this being counterbalanced by gas pressure within equalization and modulation chambers (180, 182) provided in the valve unit (26). When a hazard is detected, the valve units (26) are actuated by draining of gas from the modulation chambers (182), allowing gas flow from the cylinders (24). As gas discharge proceeds, gas flows into and out of the modulation chambers (182) so as to achieve the desired generally constant pressure gas output. Near the end of gas discharge, the spring assembly (184) becomes predominant and holds the valve unit (26) open until all gas is discharged.

25 Claims, 7 Drawing Sheets

U.S. PATENT DOCUMENTS

| | | |
|---|---|---|
| 2,333,522 A | 11/1943 | Clifton |
| 2,351,873 A * | 6/1944 | Parker ..................... 137/491 |
| 2,398,775 A | 4/1946 | Beekley et al. |
| 2,661,017 A | 12/1953 | Geiger |
| 2,890,714 A | 6/1959 | Greenwood et al. |
| 3,180,355 A | 4/1965 | Long |
| 4,312,375 A | 1/1982 | Leinemann |
| 5,653,291 A | 8/1997 | Sundholm |
| 5,860,597 A * | 1/1999 | Tarr ..................... 239/124 |
| 5,954,138 A | 9/1999 | Gabriel |

* cited by examiner

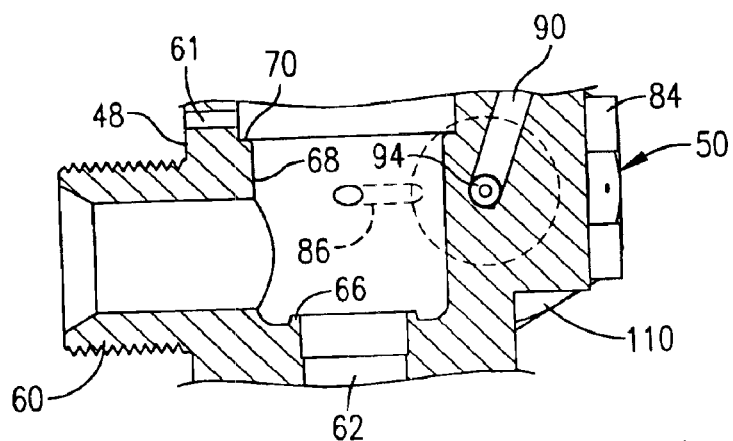
FIG. 11.
FIG. 12.
PRIOR ART
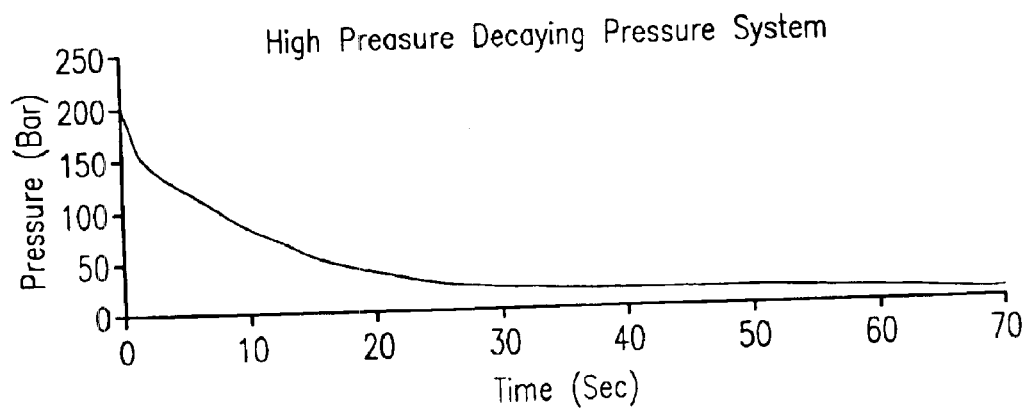
FIG. 13.
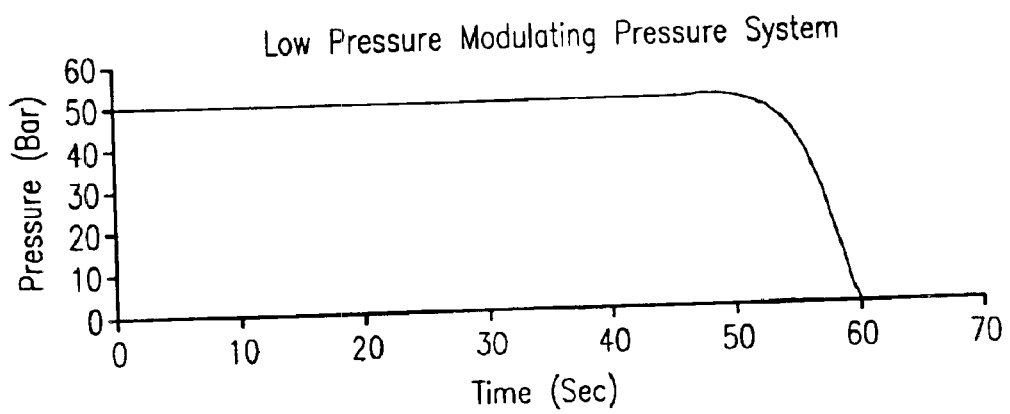

SELF-MODULATING INERT GAS FIRE SUPPRESSION SYSTEM

BACKGROUND OF THE INVENTION

1. Field of the Invention

The present invention relates to inert gas hazard suppression assemblies used to protect areas or rooms such as computer equipment rooms from hazards, and especially fire. More particularly, the invention relates to such systems, as well as pressure modulating inert gas valves forming a part thereof, where multiple high-pressure inert gas cylinders are used, with each cylinder having a valve unit operable to deliver relatively low pressure inert gas at a generally constant pressure throughout a significant period of time during which gas is delivered, thereby providing effective hazard suppression without the need for high-pressure gas handling and distribution equipment or pressure reducing orifice plates that are typical of prior inert gas hazard suppression systems. Each valve unit includes a spring assembly biasing the unit to an open, gas-flow position as well as a gas flow modulating circuit which maintains the gas pressure around the desired output pressure over a substantial part of the gas delivery cycle.

2. Description of the Prior Art

Hazard suppression systems have long been employed for protecting rooms or areas containing valuable equipment or components, such as computer rooms. Traditionally, these systems have made use of one or more of the Halon suppressants. These Halon suppressants are ideal from a hazard suppression viewpoint, i.e., they are capable very quickly suppressing a hazard, can be stored at relatively low pressures, and the quantity of suppressant required is relatively small.

However, in recent years the adverse environmental effects of the Halon has become evident and of considerable concern. Indeed, these issues are so significant that many governmental agencies have banned any further use of Halon. In Europe for example, even existing Halon systems are being replaced by systems using other inert gases such as nitrogen, argon, carbon dioxide and mixtures thereof.

In an exemplary European fire suppression system based on the use of Halon as a suppressant agent, a vessel with a nominal capacity of 150 liters filled with liquified Halon is rated to protect a volume of approximately 17,000 cubic feet. The entire piping of a Halon system need be no more than schedule 40 pipe. Where it is desired to replace a Halon installation with an inerting gas system, or in new installations based on an inerting gas, the standards require that the sufficient inert gas be delivered to a predetermined protected area so that the inert gas occupies approximately 40% by the volume of the room. This lowers the oxygen level within the room to something on the order of 10–15%, which starves the fire of oxygen. At least 95% of the requisite amount of inert gas must be delivered to the protected room in a period of 60 seconds. At the same time, the inert gas preferably should be chosen so that people can be in the room after gas delivery for a period of as much as five minutes.

A European inert gas fire suppression system when configured to replace a previous Halon system or as a new installation having a rating, which is equivalent to the exemplary 17,000 cubic foot Halon protection system referenced above, will require 10 high-pressure inert gas vessels as a replacement for the single Halon vessel. The requirement for a far larger number of inert gas storage vessels in a gas inerting fire suppression system as compared with the storage vessel requirements of a Halon system is because each inert gas vessel must be of significantly greater wall thickness and therefore as a practical matter must be significantly smaller. For example, a typical 80 liter inert gas cylinder will have a wall thickness of about 16 millimeters, be about 25 centimeters in diameter and 190 centimeters in length. The single, in this instance, 150 liter Halon vessel of the example, will be 40 centimeters in diameter and 100 centimeters in length. It is therefore obvious that on the basis that as many as 10 times as many inerting gas vessels are required as compared with a required number of Halon vessels for a particular installation that the space requirements for inerting vessels are much greater.

Because inerting gas is stored as a gas rather than a liquid at very high pressures, e.g., 300 bar, compared with the much lower 25 bar pressure in a typical Halon storage vessel, a manifold pipe must be provided that is connected to all of the inerting gas cylinders, which is capable of withstanding simultaneous release of the high-pressure gas from the storage cylinders for direction of the gas to the piping distribution system of the fire suppression system. The manifold pipe must be at least schedule 160 piping to accommodate the high pressure. A pressure letdown orifice plate is provided at the end of the manifold, which also must be capable of withstanding the 300 bar inerting gas pressure.

Thus, in an instance where an existing Halon system is to be retrofitted using high-pressure inerting gas, not only are a significantly greater number of suppressant agent storage vessels required as explained, but in addition, there is the need for a schedule 160 manifold connected to all of the storage cylinders, and in conjunction with a high-pressure orifice plate to reduce the gas pressure to a level that can be handled by the existing schedule 40 pipe. The schedule 160 pipe needed is manifestly more expensive than schedule 40 pipe and there will be a requirement for approximately 0.3 meters of schedule 160 pipe for each inert gas vessel. Similarly, the same requirement obtained in connection with a new installation.

Accordingly, there is a real and unsatisfied need in the art for improved hazard suppression systems which can make use of relatively low pressure non-Halon inert suppression gas with existing Halon system piping (or low cost, overall low pressure piping in the case of new systems) while at the same time exhibiting the performance characteristics required for rapid hazard suppression.

SUMMARY OF THE INVENTION

The present invention overcomes the problems outlined above and provides an improved hazard suppression system capable of effectively suppressing hazards such as fire through use of relatively low pressure inert gas cylinders together with specially designed cylinder-mounted discharge valves capable of delivering the gas at generally constant pressure levels throughout a majority of the time of gas delivery. In this way, use can be made of existing piping systems designed for Halon suppressants, or in the case of new systems less expensive piping and distribution hardware may be employed.

In prior high-pressure inert gas systems employing a high-pressure letdown orifice plate, release of gas from the storage cylinders for discharge from the manifold pipe through the orifice plate resulted in very high initial gas flow rates, which declined rapidly to a very low gas flow rate. As an adjunct to the initial high discharge rate of the inerting gas into the protected area, a room vent had to be provided of sufficient area to accommodate the initial gas flow. In the present instance, moderation of the gas discharge flow rate permits provision of a vent area approaching a 30% smaller flow area.

Generally speaking, a hazard suppression system in accordance with the invention for use in suppressing a hazard (e.g., typically fire) within a room or the like, comprises a plurality of pressurized gas cylinders each holding a supply of hazard-suppressing gas, with a valve unit operably coupled with each of said cylinders. A distribution assembly is connected with each of the cylinder-mounted valve units for delivery of gas to the protected room or the like. Each of the valve units has a valve body presenting an inlet adapted for coupling with a source of pressurized gas (namely a cylinder in the case of the overall suppression system) and an outlet adapted for coupling with a restricted gas receiver (the distribution assembly in the complete system). Further, a shiftable valve member having a passageway therein is located between said inlet and outlet of the valve body and is shiftable between a closed, gas flow-blocking position and an open position permitting flow of gas from said source to said receiver.

Each of the valve units has a spring operably coupled with the shiftable valve member for biasing the member toward the open position of the valve unit. Additionally, separate first and second operating surface areas form a part of the valve member; the first area is exposed to the pressurized gas whereas the second area is exposed to the pressurized gas through the member passageway. These first and second surface areas are oriented and correlated relative to the valve body to normally maintain the member in the closed position thereof against the bias of the spring. The valve unit is designed to present a modulating gas chamber formed between at least a part of the second surface area and adjacent portions of the valve body. Moreover, a modulating gas passage is formed in the valve body and communicates the valve unit outlet and the modulating gas chamber. An actuator is operably coupled with the modulating gas passage to normally block communication between the valve unit outlet and the modulating gas chamber. ,said actuator operable upon actuation thereof to open said passage and thereby drain gas from said modulating chamber through said passage to reduce the gas pressure within the modulating gas chamber and permit movement of said member to the open position thereof under the influence of gas pressure exerted against the first surface area. A gas flow restriction is located in the passageway and is operable to substantially limit the flow rate of gas between the modulating gas chamber and the passageway. The first and second surface areas of the shiftable valve member, the modulation chamber, the modulating gas flow passage, and the spring are correlated so that gas from the source is delivered to the receiver at a generally constant pressure over a substantial part of the time gas flows from the source to the receiver. This is accomplished by recurring flow of the gas into and out of the modulation chamber through the modulating gas flow passage.

The complete hazard suppression system also normally includes a sensor assembly operable to sense a hazard within the protected room or the like and, in response thereto, to actuate each of the valve unit actuators. In the case of a fire suppression system, the sensor would normally be in the form of a smoke detector. This would be electrically coupled with a solenoid valve controlling a pilot gas source. When a fire is sensed, the solenoid valve is opened allowing flow of the pilot gas to the valve units in order to actuate the latter.

The gas pressure within the cylinders, which is stored nominally at 300 bar, is released through a respective modulating valve at a constant pressure of about 20 to 50 bar at a relatively constant flow rate. Notwithstanding this relatively low controlled release pressure and flow rate, the systems of the invention are capable of supplying adequate suppression gas to the protected area within established time constraints. This represents a significant economic advantage.

BRIEF DESCRIPTION OF THE DRAWINGS

FIG. 1 is a schematic representation of a hazzard suppression system in accordance with the invention, shown in a configuration for protecting a computer room or the like;

FIG. 11 is a fragmentary sectional view of a portion of the valve body forming a part of the preferred valve unit;

FIG. 12 is a pressure versus time graph illustrating the decaying pressure characteristics of a conventional, non-modulated valve unit during discharge of very high-pressure inert gas;

FIG. 13 is a pressure versus time graph illustrating a typical pressure waveform obtained using a valve unit in accordance with the invention during discharge of relatively low pressure inert gas.

DETAILED DESCRIPTION OF THE PREFERRED EMBODIMENT

Figure 1:
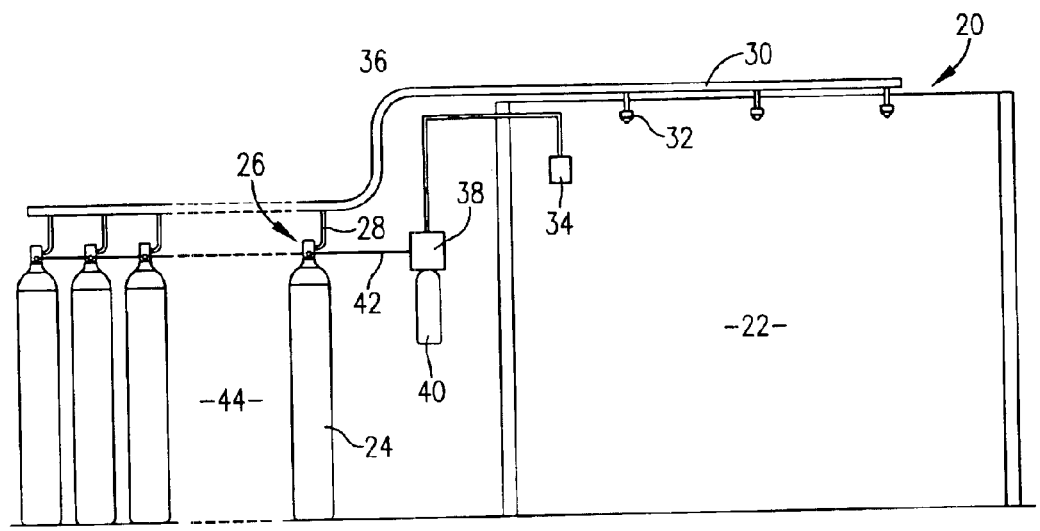

Turning now the drawings, a hazard suppression system 20 is schematically illustrated in FIG. 1. The system 20 is designed to protect an enclosed room 22 which may house computer equipment or other valuable components. Broadly speaking, the system 20 includes a plurality of high-pressure inert gas cylinders 24 each equipped with a valve unit 26. Each valve unit 26 is connected via a conduit 28 to a manifold assembly 30. As illustrated, the assembly 30 extends into room 22 and is equipped with a plurality of nozzles 32 for delivery of inert gas into the room 22 for hazard suppression purposes. The piping making up the system 30 may be conventional schedule 40 pipe as opposed to the heavy-duty schedule 160 manifold piping and pressure letdown orifice plate required of prior systems of this character. The overall system 20 further includes a hazard detector 34 which is coupled by means of an electrical cable 36 to a solenoid valve 38. The latter is operatively connected to a small cylinder 40 normally containing pressured nitrogen or some other appropriate pilot gas. The outlet of valve 38 is in the form of a pilot line 42 which is serially connected to each of the valve units 26. As depicted in FIG. 1, the plural cylinders 24 may be located within an adjacent room or storage area 44 in proximity to the room 22.

Figure 2:
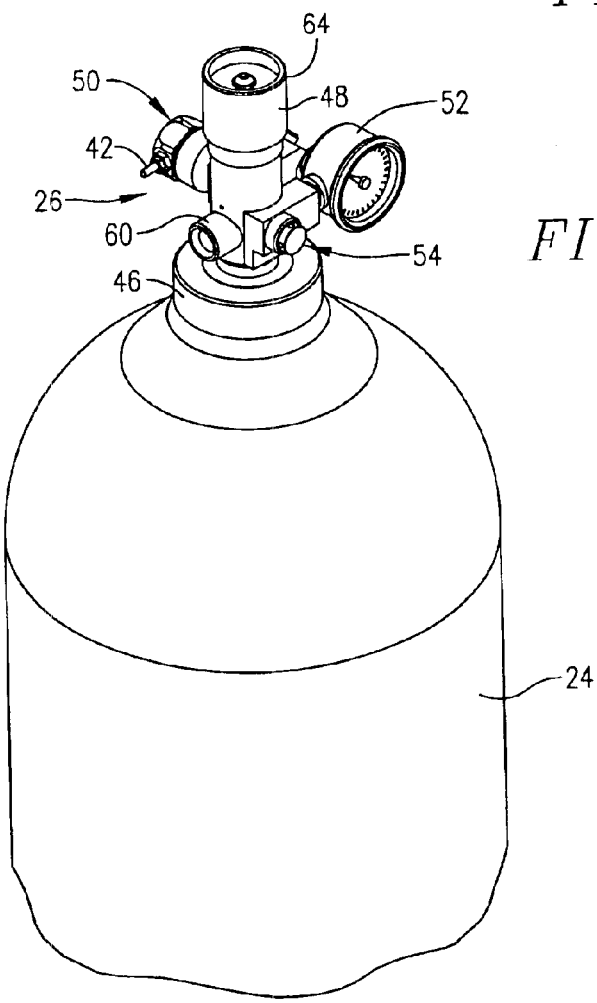
FIG. 2 is a fragmentary isometric view of an inert gas cylinder equipped with a valve unit in accordance with the invention.
Figure 3:
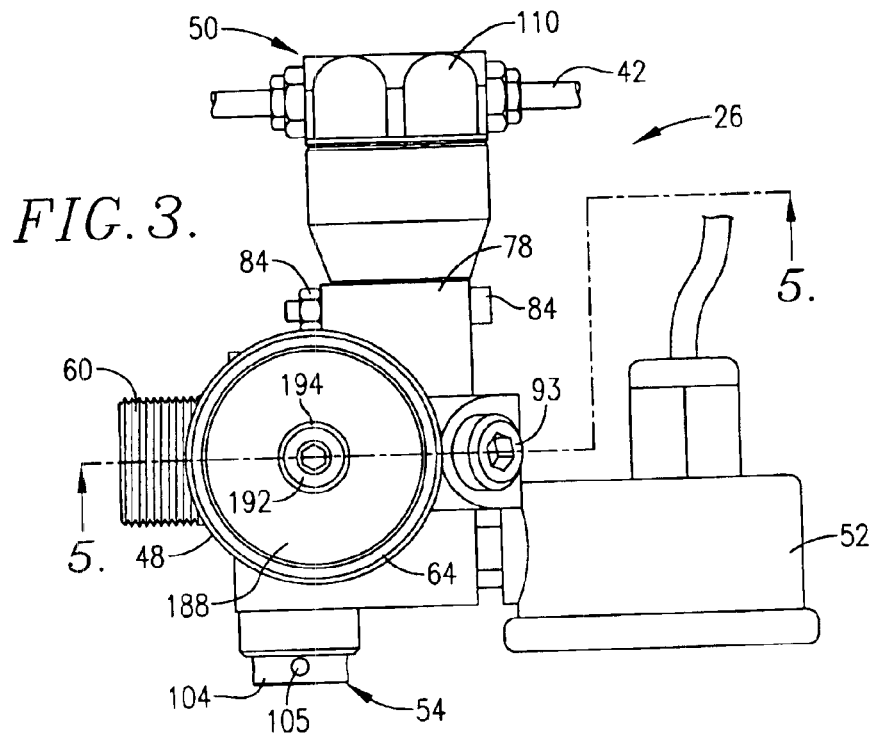
FIG. 3 is a top elevational view of the preferred valve unit.
Figure 4:
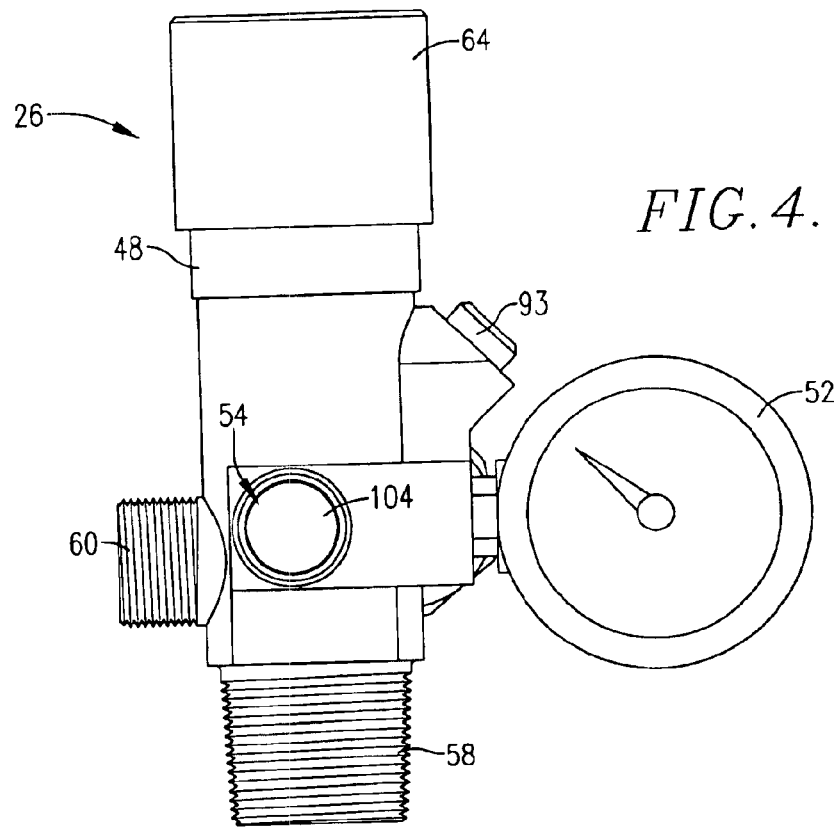
FIG. 4 is a side elevation view of the preferred valve unit.

FIG. 2 illustrates a cylinder 24, which is conventionally a heavy-walled upright metallic cylinder having an outlet neck 46. The inert gas within the cylinder (usually nitrogen, argon, carbon dioxide and/or mixtures thereof) is at relatively high-pressure on the order of 150–300 bar, and preferably on the order of 300 bar. The valve unit 26 is threaded into neck 46 (see FIG. 5) and includes an upright valve body 48 supporting an actuator 50, pressure gauge 52 and rupture disc assembly 54; additionally, the valve unit includes an internal shiftable piston-type sealing member 56 (FIG. 5) As explained more fully hereafter, the valve unit 26 is designed so that inert gas from cylinder 24 is delivered to manifold assembly 30 at a generally constant pressure lower than the pressure within the associated cylinder over a substantial part of the time that gas flows from the cylinder.

In more detail, the valve body 48 is of tubular design and has an externally threaded tubular inlet port 58 which is threadably received by neck 46, a discharge port 60 adapted for coupling to a conduit 26, a vent port 61 adjacent port 60, and a stepped through bore 62 communicating with the ports 58, 60 and 61 and an uppermost spring chamber 64. The bore 62 is configured to present (see FIG. 5), from bottom to top, an annular sealing ridge 66, radially enlarged region 68, annular shoulder 70, annular relieved zone, shoulder 74, and threading 76 leading to chamber 64.

Figure 6:
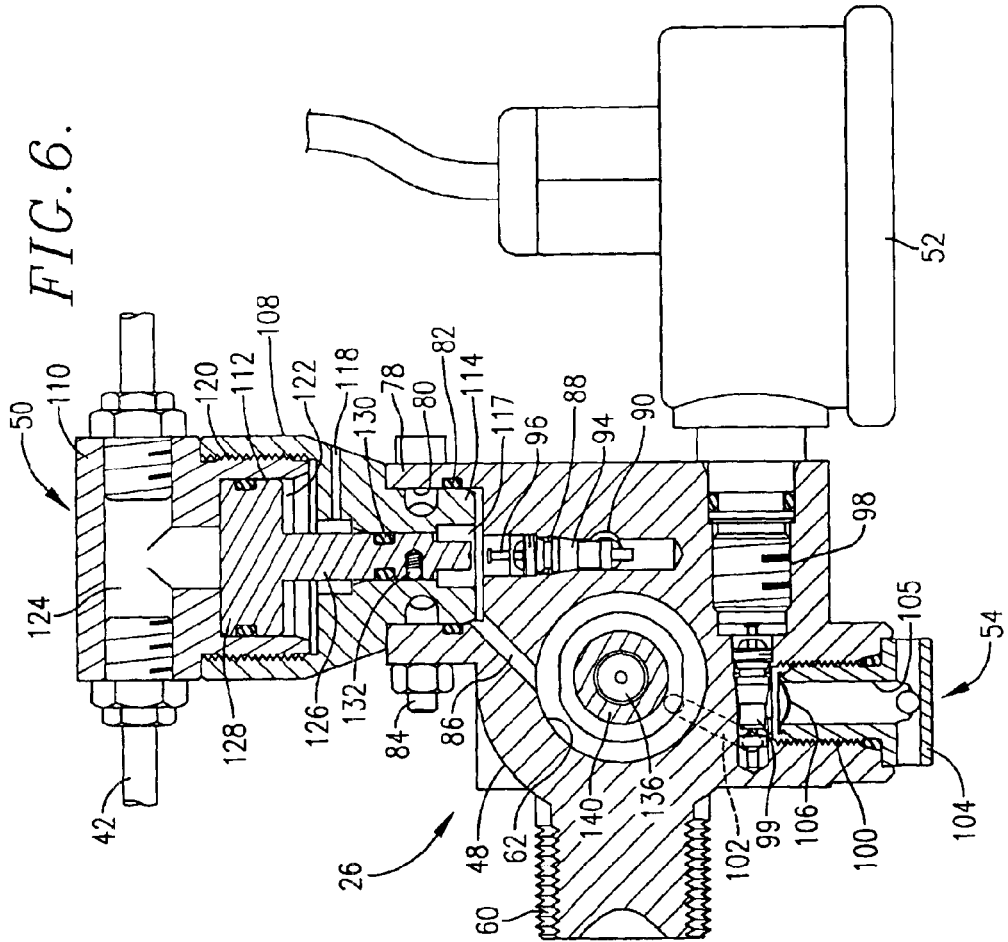
FIG. 6 is a sectional view taken along line 6—6 of FIG. 5.

The body 48 also has an extension 78 presenting a bore 80 designed to receive the inner end of actuator 50. For this purpose, an O-ring 82 is provided within bore 80 as well as bolt connectors 84 for retaining the actuator 50 therein. A pair of passageways 86 and 88 communicate with bore 80 as best seen in FIG. 6. The passageway 86 extends from bore 80 into communication with discharge port 60 (FIG. 11). Bore 88 is dead-end bore but communicates with a passage 90 extending to threaded opening 92 which receives a plug 93. A conventional Shrader valve 94 forming a part of the overall actuator 50 is seated within passageway and is normal blocking relation to the passage 90. The valve 94 includes an uppermost actuator pin 96. Another passage 95 is provided to extend from opening 92 to relieved zone 72.

Valve body 48 also includes a threaded bore 98 adapted to receive the connection end of gauge 52. The bore 98 houses a Shrader valve 99 which is in an always-open condition when gauge 52 is installed. The bore 98 also communicates with another threaded bore 100 which receives rupture disc assembly 54. A sensing bore 102 is provided within the body 48 and extends from bore 98 to inlet port 58, thereby causing pressure within cylinder 24 to communicate with gauge 52 and also bore 100.

The assembly 54 comprises a threaded, somewhat T-shaped member 104 with a central relief passage 105 positioned within bore 100. The inboard end of member 100 includes s conventional dome-shaped rupture disc 106 in normal blocking relationship to relief passage 105. It will be appreciated, however, that if the cylinder 24 experiences an overpressure condition, such is communicated through sensing bore 102 and serves to rupture disk 106; this immediately vents the cylinder through the passage 105.

The actuator 50 includes a main actuator body 108, an actuator cap 110, and an internal shiftable piston 112. The body 108 has a lowermost necked-down portion 114 seated within bore 80, and a central opening 116 with an inboard, radially expanded region 117. A vent passage 118 communicates with the opening 116 as shown. The upper end of the body 108 is internally threaded as at 120. The cap 110 is threaded into the upper end of body 108 and has a piston chamber 122 as well as a cross passage 124; the latter receives the pilot line 42 as seen in FIG. 6. Piston 112 is generally T-shaped in cross-section with a latterly extending shank 126 and outer piston head 128. Shank 126 carries a sealing O-ring 130 and a position retainer 132, the latter extending into region 117 so as to limit the range of motion of the piston 112. The head 128 also carries a sealing O-ring 134. The inboard end of shank 126 is configured to engage the upper end of Shrader valve actuating pin 96 as will be explained.

Figure 5:
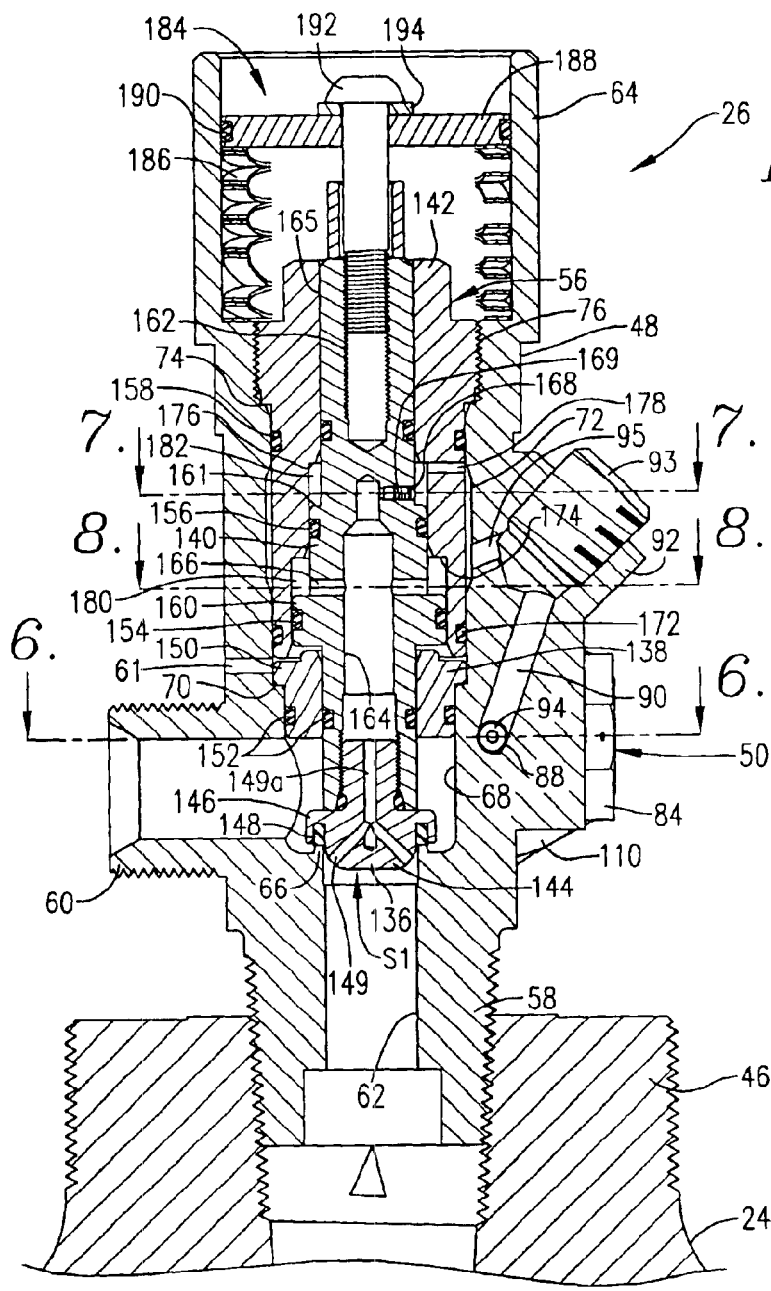
FIG. 5 is a vertical sectional view taken along line 5—5 of FIG. 3 and illustrating the details of construction of the preferred valve unit.
Figure 8:
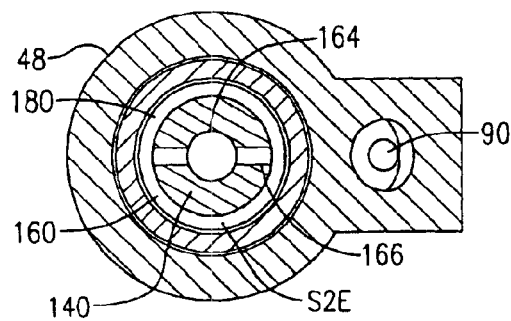
FIG. 8 is a sectional view taken along line 8—8 of FIG. 5.

The sealing member 56 is positioned within valve body 48 and is selectively shiftable therein during operation of valve unit 26. Referring to FIG. 5, the sealing member 56 includes four primary components extending from bottom to top, namely a piston seal holder 136, bottom insert 138, inner body section 140 and upper, outer body section 142.

The piston seal holder 136 includes a lower section 144 in facing relationship to bore 62 as well as an annular rib 146. A sealing ring 148 is disposed between section 144 and rib 146. A series of openings 149 are provided through holder 136 and merge to form a through passage 149a. The bottom insert 138 is in the form of annular body presenting an upper radially outwardly extending flange 150 which abuts shoulder 70 of valve body 48. The insert carries a peripheral sealing ring 152. The inner body section 140 is threadably coupled to the upwardly projecting section of holder 136 and supports a series of vertically spaced apart sealing rings 152–158. Additionally, the section 140 has a pair of vertically spaced flanged segments 160, 161 and an upper end provided with an internally threaded bore 162. The section 140 has a central passageway 164 which communicates with passage 149a. A port 166 extends from passageway 164 to a point just above flange segment 160, and another upper port 168 extends from passageway 164 to a point just about flange segment 161. A grub screw 169 is positioned within port 168 and serves to permit slow passage of gas therethrough from passageway 164, while substantially blocking reverse flow into the passageway 164.

Outer body section 142 is of tubular construction and is threaded into valve body threading 76 so as to remain stationary. The section 142 has a central through bore 165 receiving inner body section 140 and external sealing rings 170, 172. It will also be observed that the section 142 presents a pair of shoulders 174, 176, and has a lateral passageway 178 which communicates with relieved zone 72.

The complementary design of the inner and outer body sections 140, 142 defines a pair of annular chambers which are important for the operation of valve unit 24. Thus, an equalization chamber 180 is provided between the upper face of flange segment 160 and shoulder 174, and a modulation chamber 182 is defined between the upper face of flange segment 161 and shoulder 176.

The shiftable segments of sealing member 56 (i.e., piston seal holder 136 and interconnected inner body section 140) are supported by means of a spring assembly 184 located within spring chamber 64. In particular, a wave spring 186 is seated within the chamber and has at the upper end thereof an annular retainer disk 188, the latter carrying a peripheral sealing ring 190. A bolt 192, seated on washer 194, extends downwardly through disk 188 and is threadably received within bore 162. It will be appreciated that spring assembly 184 serves to urge or bias holder 136 and section 140 upwardly as viewed in FIG. 5, that is towards the valve open position of the unit 26.

Operation

It will be understood that valve unit 26 is normally in the static standby valve closed position thereof depicted in FIGS. 5–8. In this condition, the sealing member 56 is shifted downwardly as viewed in FIG. 5 so that sealing ring 148 comes into sealing engagement with ridge 66. This is accomplished by virtue of the correlation between the first operating surface area S1 presented by seal holder 136, the second operating surface area S2 presented by the sum of the equalization chamber effective surface area S2E (see FIG. 8, where S2E is the exposed portion of the face of flange 160) and the modulation chamber effective surface area S2M (see FIG. 7, where S2M is the exposed face of flange 161), and the force exerted by spring assembly 184. That is, in the closed, static position of the valve unit 26, a valve opening force is exerted against sealing member 56 in the form of pressure from the cylinder 24 is exerted against operating surface area S1 through inlet port 58, and the effect of spring assembly 184. However, this opening force is counterbalanced and exceeded by a valve closing force exerted against operating surface S2 (the sum of S2E and S2M), by virtue of passage of pressurized gas through the valve member via passage 149a, passageway 164 and ports 166, 168 to the equalization and modulation chambers 180, 182, respectively. It will be understood in this regard the grub screw 169 within port 168 permits slow passage of gas through port 168 while substantially preventing rapid reverse flow of gas from the modulation chamber 182 back into passageway 164.

In the valve close position, the actuator 50 (FIG. 6) is in its standby condition, that is, the piston 112 is elevated and Shrader valve 94 is in a flow-blocking relation relative to passage 90.

The operation of system 22 during a hazard suppression will now be described. In this discussion, reference will be made to the specific components of the system, and also to FIG. 14, which is a flow diagram of the system operation intended to facilitate an understanding of the invention.

Figure 10:
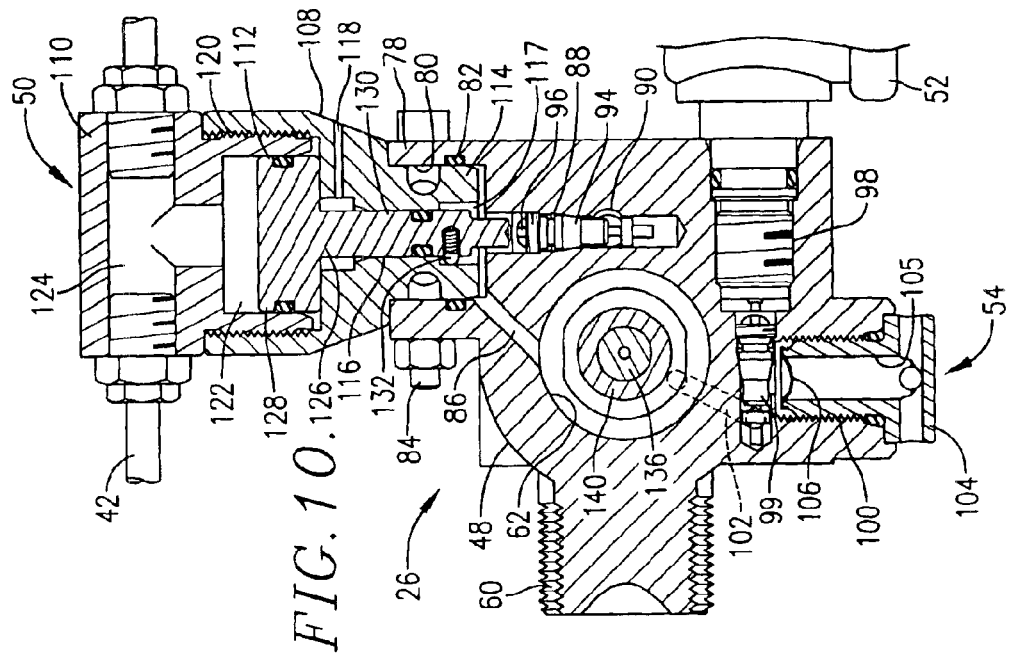
FIG. 10 is a sectional view taken along line 10—10 of FIG. 9.
Figure 9:
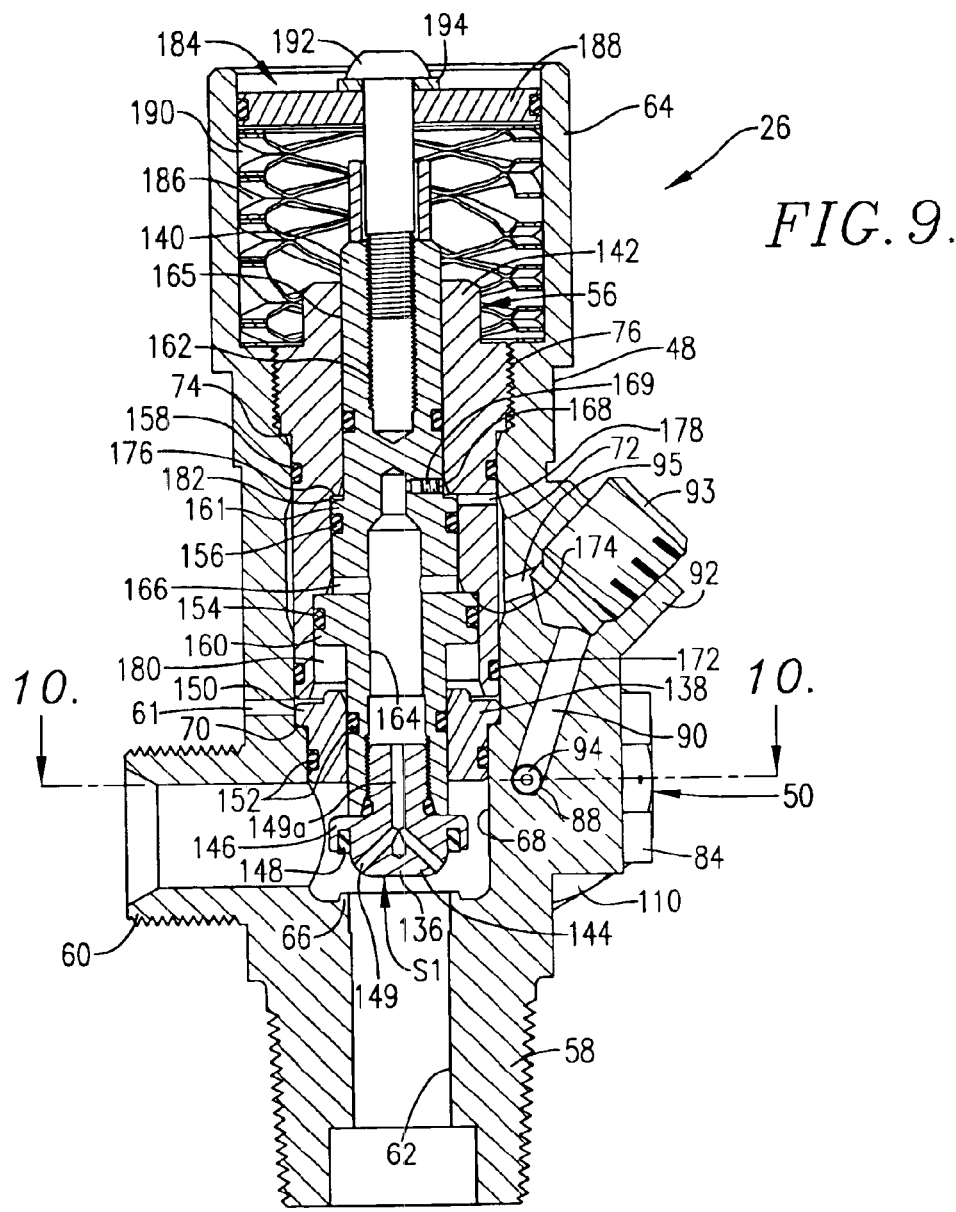
FIG. 9 is a vertical sectional view similar to that of FIG. 5, but depicting the valve unit in its open, discharge position.
Figure 7:
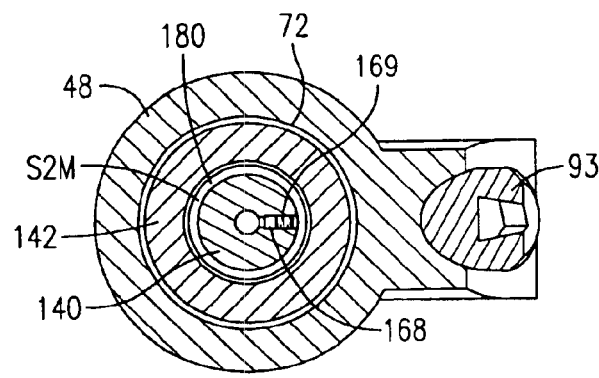
FIG. 7 is a sectional view taken along line 7—7 of FIG. 5.

In the event of a hazard condition such as a fire in room 22, the sensor 34 (e.g., a smoke detector) operates (Step 196) and sends an opening signal to solenoid valve 38 (Step 198). Compressed gas (usually nitrogen) then passes through pilot line 42 (Step 200) so as to actuate each of the valve units 26 respectively coupled to the corresponding cylinders 24 (Step 202). Turning to FIG. 10, upon introduction of pilot gas through line 32, the piston 112 is shifted downwardly so that the inboard butt end thereof engages and shifts actuating pin 96 of Shrader valve 94. As a consequence, the passage 90 is opened. When this occurs, gas flows from modulating chamber 182 into and through a modulating passage made up of annular relieved zone 72, passage 95, opening 92, and passage 90 to discharge port 60 (Step 204). At this point, the valve opening force exerted by gas pressure against surface area S1 and the spring assembly 184 is sufficient to move the sealing member 56 to the valve open position depicted in FIGS. 9–10. Therefore, gas from the cylinder 24 passes from inlet port 58 through discharge port 60, conduit 28, manifold 30 and nozzles 32 (Step 206).

As indicated previously, a problem with prior discharge valves in the context of high-pressure hazard suppression systems is the tendency of such valves to exhibit a pronounced pressure decay pattern as illustrated in FIG. 12. This characteristic decay pattern results in an initial "burst" of inert gas delivery owing to the high pressure of the gas (on the order of 200 bar or around 3000 psi) with exponential decline in pressure during the course of remaining gas discharge. While these prior systems are capable of delivering adequate volumes of inert gas within the hazard suppression time frame, use of the high-pressure gas cylinders entails considerable expense in terms of piping and related gas handling and distribution hardware.

This problem is overcome by the present invention which exhibits the general pressure wave form of FIG. 13, i.e., gas is delivered at a generally constant pressure lower than the pressure of gas within the cylinder 24, but over a substantial period (at least about 50%, more preferably at least about 75%) of the time during which gas is discharged by the valve unit 26. This type of pressure waveform enables release of gas at a much lower inert gas pressure, on the order of from about 10 to about 100 bar, or from around 150 to 1500 psi, and as a consequence use can be made of low-cost gas handling and distribution equipment, often the existing equipment in systems heretofore employing Halon as suppressants. In a preferred system, the release pressure is about 50 bar.

Specifically, as gas from the cylinders 24 is initially delivered to the discharge port 60, a back pressure is generated within the valve unit which causes gas from the cylinder to travel back through the above-described modulating passage comprising passage 90, opening 92, passage 95, relieved zone 72 and into modulating chamber 182. This serves to move the sealing member 56 back toward the closed position of the valve unit. This in turn creates a restriction to gas flow from the cylinder 24, which continues until the pressure within discharge port 60 is reduced. Thereupon, gas from the modulation chamber 182 flows along the described modulating passage to the discharge port. This back and forth gas flow pattern along the modulating passage recurs throughout a majority of the time gas flows from the cylinders 24. The result is a pressure modulation of gas flow from the cylinder 24 to create the generally horizontal portion of the FIG. 13 wave form. Towards the end of discharge of gas from the cylinder 24, the spring force exerted from assembly 184 becomes greater than the sum of the forces exerted in the equalization and modulation chambers, so that the spring becomes the sole operating element in the valve unit and the latter remains full open until gas discharges completely. It will be understood in this respect that while FIG. 13 depicts an essentially straight line, constant pressure condition with a rapid tail-off at the end of gas discharge, in practice the wave form would exhibit fluctuations generally around the straight line portion of the straight line.

Figure 14:
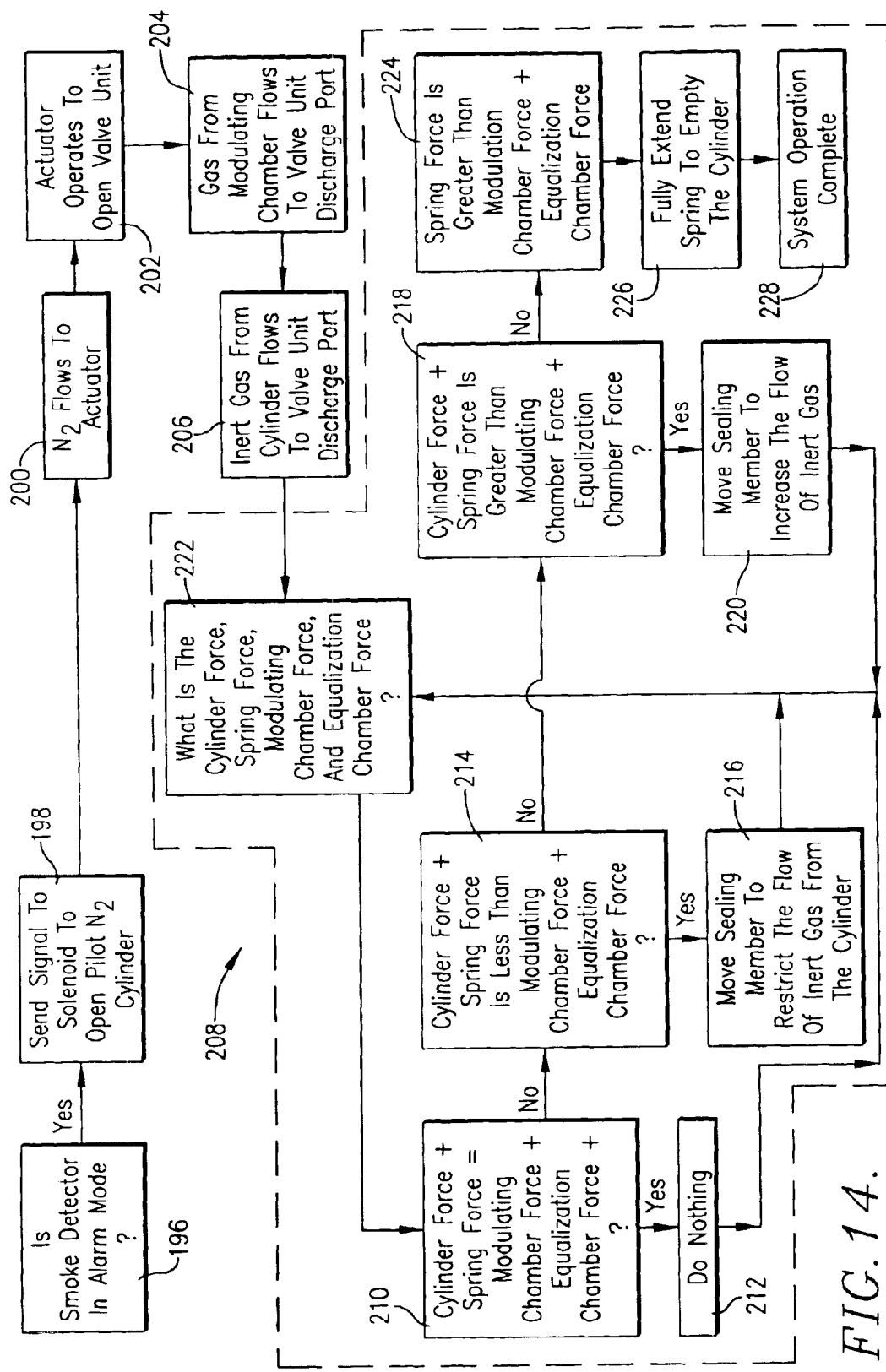
FIG. 14 is a flow diagram illustrating the operation of the preferred valve unit.

The modulation operation of unit 26 is illustrated in FIG. 14 within the dotted line box 208, in the form of a logic diagram. Thus, in Step 210, if the cylinder force (i.e., the force exerted by the cylinder gas against surface area S1) plus the spring force (i.e., the force exerted by spring assembly 184) equals the counterforce exerted against second surface area S2 (the sum of the S2E and S2M surface areas) in the equalization and modulation chambers 180, 182, the system is balanced, Step 212. If the cylinder force plus the spring assembly force is less than the counterforce (Step 214), the sealing member is moved toward the valve closed position thereof (Step 216), to restrict the flow of gas from the cylinder. If the cylinder force plus the spring force is greater than the counterforce (Step 218), then the sealing member is moved toward the valve open position (Step 220). This modulation continues by the effective determination of the cylinder force, spring force and counterforce (Step 222) until, in Step 218, the spring force is greater than the counterforce exerted through the equalization and modulation chambers (Step 224). At this point, the spring assembly fully extends (Step 226), which is generally corresponds to the downwardly directed "knee" portion of the FIG. 13 wave form. This completes the system operation Step 228.

We claim:

1. In a valve unit having a valve body presenting an inlet adapted for coupling with a source of pressurized gas pressurized at a first level and an outlet adapted for coupling with a restricted gas receiver, a shiftable valve member having a passageway therein and located between said inlet and outlet and shiftable between a closed, gas flow-blocking position and an open position permitting flow of gas from said source to said receiver, the improvement comprising:

a spring operably coupled with said member and biasing the member toward the open position thereof;

separate first and second operating surface areas forming a part of said member, said first area exposed to said pressurized gas and said second area exposed to said pressurized gas through said passageway, said first and second surface areas being oriented and correlated relative to said valve body to normally maintain said member in the closed position thereof against the bias of said spring, there being a modulating gas chamber formed between at least a part of said second operating surface area and adjacent portions of said valve body, and a passage formed in said valve body and communicating said outlet and said modulating gas chamber;

an actuator operably coupled with said passage and normally blocking communication between said outlet and said modulating gas chamber, said actuator operable upon actuation thereof to open said passage and thereby drain gas from said modulating chamber through said passage to reduce the gas pressure within the modulating gas chamber and permit movement of said member to the open position thereof under the influence of gas pressure exerted against said first surface area; and a gas flow restriction in said passageway operable to substantially limit the flow rate of gas between said modulating gas chamber and said passageway, said first and second operating surface areas, modulation chamber, passage and spring being correlated so that gas from said source is delivered to said receiver at a generally constant pressure over a substantial part of the time gas flows from the source to the receiver by flow of said gas into and out of said modulation chamber.

2. The valve unit of claim 1, said second operating surface area comprising a pair of axially spaced annular surface areas.

3. The valve unit of claim 1, there being an equalization gas chamber formed between a portion of said second operating surface area and an adjacent segment of said valve body.

4. The valve unit of claim 1, said spring coupled to said member at a point remote from said first operating surface area thereof.

5. The valve unit of claim 1, said spring comprising a wave spring.

6. The valve unit of claim 1, said actuator comprising a selectively shiftable piston and a normally closed Shrader valve oriented for opening of the Shrader valve upon shifting of said piston.

7. The valve unit of claim 6, there being a pilot gas line operably coupled with said piston and adapted for connection to a source of pilot gas, said piston being shiftable upon introduction of pilot gas into said pilot gas line.

8. The valve unit of claim 1, including a pressure gauge exposed to said pressurized gas.

9. The valve unit of claim 1, including a rupture disk assembly for venting of said pressurized gas in response to an overpressure within said source.

10. The valve unit of claim 1, said restriction comprising a grub screw located within said passageway adjacent said modulating gas chamber.

11. A hazard suppression system for suppressing a hazard within a room, said system comprising:

a plurality of pressurized gas cylinders each holding a supply of hazard-suppressing gas;

a valve unit operably coupled with each of said cylinders;

a distribution assembly connected with each of said valve units for delivery of gas therefrom to said room or the like, each of said valve units having a valve body presenting an inlet adapted for coupling with a source of pressurized gas pressurized at a first level and an outlet adapted for coupling with a restricted gas receiver, a shiftable valve member having a passageway therein and located between said inlet and outlet and shiftable between a closed, gas flow-blocking position and an open position permitting flow of gas from said source to said receiver, each of the valve units further including a spring operably coupled with said member and biasing the member toward the open position thereof;

separate first and second operating surface areas forming a part of said member, said first operating surface area exposed to said pressurized gas and said second operating surface area exposed to said pressurized gas through said passageway, said first and second surface areas being oriented and correlated relative to said valve body to normally maintain said member in the closed position thereof against the bias of said spring, there being a modulating gas chamber formed between at least a part of said second operating surface area and adjacent portions of said valve body, and a passage formed in said valve body and communicating said outlet and said modulating gas chamber;

an actuator operably coupled with said passage and normally blocking communication between said outlet and said modulating gas chamber, said actuator operable upon actuation thereof to open said passage and thereby drain gas from said modulating chamber through said passage to reduce the gas pressure within the modulating gas chamber and permit movement of said member to the open position thereof under the influence of gas pressure exerted against said first surface area; and a gas flow restriction in said passageway operable to substantially limit the flow rate of gas between said modulating gas chamber and said passageway, said first and second surface areas, modulation chamber, passage and spring being correlated so that gas from said source is delivered to said receiver at a generally constant pressure over a substantial part of the time gas flows from the source to the receiver by flow of said gas into and out of said modulation chamber; and a sensor assembly operable to sense a hazard within a room or the like and, in response thereto, to actuate each of said actuators.

12. The hazard suppression system of claim 11, said second operating surface area comprising a pair of axially spaced annular surface areas.

13. The hazard suppression system of claim 11, there being an equalization gas chamber formed between a portion of said second operating surface area and an adjacent segment of said valve body.

14. The hazard suppression system of claim 11, said spring coupled to said member at a point remote from said first operating surface area thereof.

15. The hazard suppression system of claim 11, said spring comprising a wave spring.

16. The hazard suppression system of claim 11, said actuator comprising a selectively shiftable piston and a normally closed Shrader valve oriented for opening of the Shrader valve upon shifting of said piston.

17. The hazard suppression system of claim 16, there being a pilot gas line operably coupled with said piston and adapted for connection to a source of pilot gas, said piston being shiftable upon introduction of pilot gas into said pilot gas line.

18. The hazard suppression system of claim 11, including a pressure gauge exposed to said pressurized gas.

19. The hazard suppression system of claim 11, including a rupture disk assembly for venting of said pressurized gas in response to an overpressure within said source.

20. The hazard suppression system of claim 11, said restriction comprising a grub screw located within said passageway adjacent said modulating gas chamber.

21. The hazard suppression system of claim 11, said sensor assembly including:
   a hazard detecting sensor proximal to said room or the like;
   a supply of pressurized pilot gas;
   a valve operably coupled with said supply of pilot gas, said sensor and valve being operably coupled such that upon detection of a hazard by the sensor said valve is opened; and
   a pilot line operably connected between said valve and each of said valve units.

22. The hazard suppression system of claim 11, said distribution assembly comprising a manifold assembly for delivery of hazard suppressing gas from said cylinders to said room or the like, there being a conduit operably coupling the outlet of each of said valve units and said manifold assembly.

23. The hazard suppression system of claim 11, the gas in said cylinders being at a pressure of from about 150–300 bar.

24. The hazard suppression system of claim 23, said pressure being about 50 bar.

25. The hazard suppression system of claim 11, wherein the gas is delivered to said receiver at a pressure in the range of about 10 to 100 bar.

* * * * *